United States Patent [19]

Stromblad et al.

[11] 4,143,004

[45] Mar. 6, 1979

[54] PROCESS FOR THE PREPARATION OF POLYURETHANE FOAM

[75] Inventors: Mats V. Stromblad, Uddevalla; Bo T. Idstrom, Stenungsund, both of Sweden

[73] Assignee: Berol Kemi AB, Stenungsund, Sweden

[21] Appl. No.: 837,967

[22] Filed: Sep. 29, 1977

Related U.S. Application Data

[63] Continuation of Ser. No. 618,724, Oct. 1, 1975, abandoned.

[30] Foreign Application Priority Data

Oct. 2, 1974 [SE] Sweden ................................. 7412427

[51] Int. Cl.$^2$ ................................................ C08J 9/00
[52] U.S. Cl. ...................................... 521/174; 521/905
[58] Field of Search ..................... 260/2.5 AP, 2.5 AD

[56] References Cited

U.S. PATENT DOCUMENTS

| 3,461,086 | 8/1969 | Mogford et al. ............... 260/2.5 AP |
| 3,489,698 | 1/1970 | Morehouse .................... 260/2.5 AP |
| 3,546,145 | 12/1970 | Granger et al. ................ 260/2.5 AP |
| 3,799,898 | 3/1974 | Lamplugh et al. ............ 260/2.5 AD |
| 3,857,800 | 12/1974 | Fishbein et al. ............... 260/2.5 AP |
| 3,865,762 | 2/1975 | Repiquet et al. .............. 260/2.5 AP |
| 4,008,189 | 2/1977 | van Leurven et al. ....... 260/2.5 AD |

FOREIGN PATENT DOCUMENTS 2129823 12/1973 France.
2172860 11/1972 France.

*Primary Examiner*—Lewis T. Jacobs

[57] ABSTRACT

A process is provided for the preparation of soft hydrophilic polyurethane foam using a polyether polyol mixture having a high proportion of primary alcohol groups and a selected ratio of polyisocyanate to polyol.

5 Claims, No Drawings

PROCESS FOR THE PREPARATION OF POLYURETHANE FOAM

This is a continuation of application Ser. No. 618,724, filed Oct. 1, 1975, now abandoned.

The degree of hardness is one basis of classification of polyurethane foams, and one usually distinguishes between flexible foam, semi-rigid foam, and rigid foam. The hydroxyl content or number of the polyether polyol used principally determines the degree of hardness. A step forward in the development of polyurethane foam less hard or softer than what is referred to as flexible foam is the so-called supersoft foam, obtained by reacting a polyisocyanate with a polyol of suitable properties in a weight ratio such that the isocyanate index, i.e. the ratio between isocyanate groups and hydroxyl groups present in the reaction mixture, does not exceed 1.0. Also, certain softening agents and blowing agents may in some cases decrease the hardness of the foam.

Hypersoft polyurethane foams (i.e. foams of very low hardness) have been prepared by the process disclosed in French Pat. No. 2,172,860, using a mixture of two mutually insoluble polyether polyols, in which case the mixture of the two polyols must conform to the following specifications:

(a) The mixture of polyether polyols contains from 50 to 70% by weight of oxyethylene units, i.e., units derived from ethylene oxide;

(b) The proportion of primary hydroxyl groups compared to the total amount of hydroxyl groups is from 35 to 50%;

(c) The ratio between the percentage by weight of oxyethylene units, i.e. units derived from ethylene oxide, according to (a) and the percentage of primary hydroxyl groups according to (b) is from 1.1 to 1.7.

These soft foams have a considerably lower degree of hardness, i.e. are softer, than the previously mentioned supersoft foams. This is why this category of foam is usually designated hypersoft.

In accordance with the present invention, polyurethane foams softer than hypersoft foams, i.e. of still lower hardness than those polyurethane foams prepared according to the process of French Pat. No. 2,172,860, are obtained by using a polyether polyol mixture containing an unusually high proportion of primary hydroxyl groups, within a carefully selected ratio of the amount of polyisocyanate to polyol. More particularly, the present invention provides a process for the preparation of superhypersoft polyurethane foam, of a low degree of hardness, that is also highly hydrophilic, by reacting polyisocyanate with a polyether polyol mixture of at least two mutually insoluble polyfunctional polyether polyols containing from about 50 to about 70% by weight oxyethylene units (derived from ethylene oxide) in the presence of catalyst, blowing agent, foam stabilizer and, if desired, any other additives commonly used in the preparation of polyurethane foam. The term "polyfunctional" as used herein refers to trifunctional and higher, and excludes mono and bifunctional.

The polyether polyol mixture used in the process of the invention has a hydroxyl number of from 35 to 45, and from 55 to 80% primary hydroxyl groups of the total number of hydroxyl groups in the polyether polyol mixture. The amounts of polyisocyanate and polyether polyol are selected so that the ratio of isocyanate groups to hydroxyl groups is from 0.85 to 1.05, preferably from 0.90 to 0.98.

The hydroxyl number and the proportion of primary hydroxyl groups are determined according to the method described in *Analytical Chemistry* 33 896 (1961).

Extensive investigations have shown that one single polyol having properties corresponding to that of the polyol mixture does not produce a polyurethane from having the desired properties, nor does a polyol mixture having properties other than those stated above.

An especially remarkable feature of the polyurethane foams prepared according to the invention is that the extremely low hardness (i.e., super hypersoftness) can be combined with excellent physical properties, such as elongation at break, tensile strength and compression set. Further, during the foaming process the foam shows excellent stability. Thus, it is of decisive importance that the conditions according to the invention be met, since otherwise the stated benefits of the invention will not be obtained.

The polyether polyols employed in the process of the invention are obtained by adding at least two different alkylene oxides, of which one is ethylene oxide, to a polyfunctional nucleus having at least three reactive hydrogens. This nucleus can be a polyol having at least three hydroxyl groups. Triols such as glycerol and trimethylolpropane are preferred, but trihydroxy alkanol amines such as triethanolamine are also useful. The oxyethylene units of the polyether polyol mixture derived from ethylene oxide is from 50 to 70% by weight; the remaining oxyalkylene units derived from higher alkylene oxides can be from propylene oxide, butylene oxide, or mixtures of these.

The addition of the alkylene oxides is carried out by conventional methods. Ethylene oxide and higher alkylene oxides can be added either in admixture or separately, in one or more increments or batches. In order to obtain high softness it is essential that the two polyether polyols be mutually insoluble, i.e. that they have different hydrophilicity. The weight ratio of the polyether polyols should fall within the range from 1:10 to 10:1.

One of the two polyols should be soluble in water, and should preferably have an HLB value of at least 15, and a turbidity point of at least 88° C. Its average molecular weight is from 3000 to 5000.

The other polyether polyol should be considerably more hydrophobic, and should have an HLB value not exceeding 5, and a turbidity point of below 70° C. The average molecular weight of this polyether polyol can be somewhat higher, and range from 3000 to 7000.

The HLB values are calculated according to W. C. Griffin, *Official Digest,* June 1956, 447, and the turbidity points are calculated according to Lowe et al., *Journal of Cellular Plastics,* January 1965, 121.

Illustrative examples of suitable polyols according to the invention are the following:

EXAMPLE A

Onto 92 parts by weight of glycerol there are first condensed 4,000 parts by weight of propylene oxide, and thereupon 1300 parts by weight of ethylene oxide are condensed thereon. The resulting polyether polyol adduct has a hydroxyl number of 36 and 75% primary hydroxyl groups.

EXAMPLE B

Onto 92 parts by weight of glycerol there are first condensed 470 parts by weight of propylene oxide, and thereupon 3440 parts by weight of a mixture comprising 18% of propylene oxide and 82% of ethylene oxide are condensed thereon. The resulting polyether polyol adduct has a hydroxyl number of 42, and 58% primary hydroxyl groups.

EXAMPLE C

Onto 134 parts by weight of trimethylolpropane there are first condensed 3000 parts by weight of a mixture comprising 18% of propylene oxide and 82% of ethylene oxide, and thereupon 300 parts by weight of propylene oxide and finally 350 parts by weight of ethylene oxide are condensed thereon. The resulting polyol has a hydroxyl number of 42, and 73% primary hydroxyl groups.

EXAMPLE D

Onto 99 parts by weight of glycerol there are first condensed 5000 parts by weight of propylene oxide and then 100 parts by weight of ethylene oxide. The resulting polyol has a hydroxyl number of about 34, and 75% primary hydroxyl groups.

The polyisocyanate to be used according to the present invention is at least bifunctional, but it can also be polyfunctional. Examples of suitable isocyanates are toluene diisocyanate, hexamethylene diisocyanate, diphenylmethane diisocyanate, polyphenylpolymethylenepolyisocyanate, and mixtures thereof. The preferred isocyanate is toluene diisocyanate, which can be in its isomeric 2,4-form, or 2,6-form, or as mixtures of these isomeric forms. A suitable isomer mixture comprises about 80% of 2,4-isomer and 20% of 2,6-isomer, but other proportions can also be used successfully. The amount of isocyanate added should be adapted to the remaining components contained in the reaction mixture in such a way that the isocyanate index, i.e. the ratio between isocyanate groups and hydroxyl groups present in the mixture, is from about 0.85 to about 1.05, preferably from 0.90 to 0.98.

The reaction between isocyanate and polyether polyol is carried out in the presence of an amine catalyst, preferably a tertiary amine, such as triethylenediamine, dimethylaminoethanol, and tetramethylethylenediamine. One can also use organometallic salt catalysts, such as tin-2-ethylhexoate, tin dibutyl dilaurate, lead naphthenate, and cobalt naphthenate; such salts are preferably used in small amounts, and in combination with amine catalysts.

The cell formation and accordingly the density of the polyurethane foam is controlled by adjusting, in a conventional way, the amount of water added and any other blowing agents, such as trichlorofluoromethane or methylene chloride. The addition of foam stabilizers, such as silicone oil, will ensure a good foam stability, and good physical strength properties. In addition to the above-stated additives, other additives can be added, if desired, using well-known techniques.

The following Examples in the opinion of the inventors represent preferred embodiments of their invention.

EXAMPLES 1 TO 3

With the aid of a five-component laboratory foaming machine, a polyether polyol corresponding to Example A above was mixed with a polyether polyol corresponding to Example B above, water, silicone oil, triethylenediamine, dimethylaminoethanol and trichlorofluoromethane in the parts by weight stated in Table I below, together with toluene diisocyanate (80% 2,4-isomer, 20% 2,5-isomer) in an amount to bring the isocyanate index to 0.95. The mixture was poured into a 50 × 50 × 30 cm mold and the resulting foam allowed to set for one day at room temperature. Upon conditioning for 24 hours in a constant temperature room, physical tests were carried out. The following results were obtained:

TABLE I

| Formulation | Parts by Weight | | |
|---|---|---|---|
| | Example 1 | Example 2 | Example 3 |
| Polyether polyol of Example A | 25 | 25 | 25 |
| Polyether polyol of Example B | 75 | 75 | 75 |
| Water | 3.5 | 3.5 | 3.5 |
| Silicone oil | 1.5 | 1.5 | 1.5 |
| Triethylenediamine (33%) | 0.2 | 0.2 | 0.2 |
| Dimethylaminoethanol | 0.8 | 0.8 | 0.8 |
| Trichlorofluoromethane | 15 | 7.5 | 0 |
| Toluene diisocyanate | an amount to give an isocyanate index of 0.95 | | |
| Physical properties (ASTM D 1584-629) | | | |
| Density, kg/m$^3$ | 19.7 | 23.5 | 27 |
| Tensile strength, kg/cm$^2$ | 1.2 | 1.3 | 1.7 |
| Elongation at break, % | 490 | 420 | 395 |
| Tear strength, kg/cm | 0.5 | 0.4 | 0.6 |
| 90% compression set, % | 10 | 10 | 10 |
| Impact resilience, % | 50 | 50 | 50 |
| Hardness, 25% compression, kp/dm$^2$ | 0.6 | 0.9 | 1.1 |
| Hardness, 65% compression, kp/dm$^2$ | 7.2 | 1.7 | 2.1 |

From the results it is evident that the foams are quite soft, i.e., they have an extremely low hardness. For comparison, the foam prepared according to the French Pat. No. 2,172,860 at about the same density and about the same physical properties, has a hardness twice that of Example 2.

EXAMPLES 4 TO 5

With the aid of a five component laboratory foaming machine polyether polyol of Example D was mixed with polyether polyol of Example B (which were mutually insoluble), water, silicone oil, triethylene diamine and dimethylaminoethanol in the amounts stated in Table II below, together with toluene diisocyanate (80% 2,4-isomer, 20% 2,6-isomer) in an amount to give an isocyanate index of 0.95. The mixture was poured into a 50 × 50 × 30 cm mold and the resulting foam was allowed to set for one day at room temperature. Upon conditioning for 24 hours in a constant temperature room, physical tests were carried out. The following results were obtained:

TABLE II

| Formulation | Parts by Weight | |
|---|---|---|
| | Example 4 | Example 5 |
| Polyether polyol of Example D | 20 | 30 |
| Polyether polyol of Example B | 80 | 70 |
| Water | 3.5 | 3.5 |
| Silicone oil | 1.5 | 1.5 |
| Triethylenediamine (33%) | 0.15 | 0.15 |
| Dimethylaminoethanol | 0.55 | 0.55 |
| Toluene diisocyanate | an amount to give an isocyanate index of 0.95 | |
| Physical properties (ASTM D 1564-629) | | |
| Density, kg/m$^3$ | 29 | 29 |
| Hardness, 25% compression, kp/dm$^2$ | 1.3 | 1.0 |
| Hardness, 65% compression, kp/dm$^2$ | 2.5 | 2.0 |

The polyurethane foams prepared showed, in addition to low hardness, excellent physical properties, such as a regular cell structure, a high elongation at break, and a high tensile strength. During the foaming, no shrinkage is observed.

Having regard to the foregoing disclosure, the following is claimed as the inventive and patentable embodiments thereof:

1. In the process for the preparation of soft highly hydrophilic polyurethane foam which comprises reacting a polyisocyanate with a polyether polyol in the presence of catalyst, blowing agent, and foam stabilizer, the improvement which comprises reacting with the polyisocyanate at least two mutually insoluble polyfunctional polyether polyols, in amounts to provide a ratio of isocyanate groups to hydroxyl groups within the range from about 0.90 to about 0.98, the polyether polyol mixture having from about 50 to about 70% oxyethylene units, a hydroxyl number of from 35 to 45, and from 55 to 80% primary hydroxyl groups by weight of the total number of hydroxyl groups in the polyether polyol mixture.

2. A process according to claim 1, in which one of the polyether polyols is soluble in water.

3. A process according to claim 2, in which the water-soluble polyether polyol has an HLB value of at least 15 and a turbidity point of at least 88° C.

4. A process according to claim 1, in which one of the polyether polyols has an HLB value not exceeding 5, and a turbidity point of below 70° C.

5. A process according to claim 1, in which the polyisocyanate is toluene diisocyanate.

* * * * *

UNITED STATES PATENT AND TRADEMARK OFFICE
CERTIFICATE OF CORRECTION

PATENT NO. : 4,143,004
DATED : March 6, 1979
INVENTOR(S) : Mats V. Stromblad et al It is certified that error appears in the above–identified patent and that said Letters Patent are hereby corrected as shown below:

Column 2, line 5 : "33" should be --33--.
Column 4, line 21, Table I : "1584" should be --1564--.

Signed and Sealed this

Sixteenth Day of October 1979

[SEAL]

Attest:

RUTH C. MASON
Attesting Officer

LUTRELLE F. PARKER
Acting Commissioner of Patents and Trademarks